(12) United States Patent
Silberberg

(10) Patent No.: US 9,243,907 B2
(45) Date of Patent: *Jan. 26, 2016

(54) BUBBLE LEVEL

(71) Applicant: Mark L Silberberg, Fallbrook, CA (US)

(72) Inventor: Mark L Silberberg, Fallbrook, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/925,584

(22) Filed: Jun. 24, 2013

(65) Prior Publication Data

US 2014/0007439 A1 Jan. 9, 2014

Related U.S. Application Data

(63) Continuation-in-part of application No. 13/528,623, filed on Jun. 20, 2012, now Pat. No. 9,021,710.

(51) Int. Cl.
*G01C 9/26* (2006.01)
*G01C 9/28* (2006.01)

(52) U.S. Cl.
CPC ...... *G01C 9/26* (2013.01); *G01C 9/28* (2013.01)

(58) Field of Classification Search
CPC .............. G01C 9/24; G01C 9/26; G01C 9/28; G01C 9/34
USPC ........... 33/347, 350, 370, 371, 372, 373, 376, 33/379, 381
See application file for complete search history.

(56) References Cited

U.S. PATENT DOCUMENTS

| | | | |
|---|---|---|---|
| 1,523,932 A * | 1/1925 | Davies | 411/393 |
| 2,635,350 A | 4/1953 | Bettega | |
| 2,748,494 A | 6/1956 | Raney | |
| 4,394,799 A * | 7/1983 | Moree et al. | 33/343 |
| D301,553 S | 6/1989 | Makofsky et al. | |
| D332,226 S | 1/1993 | Hutchins et al. | |
| D355,134 S | 2/1995 | Kennedy | |
| D371,309 S | 7/1996 | Webb | |
| D389,758 S | 1/1998 | Motamed | |
| 5,743,691 A | 4/1998 | Donovan | |
| D395,013 S | 6/1998 | Webb | |
| D409,100 S | 5/1999 | Brimer | |
| D411,470 S | 6/1999 | Webb | |
| D538,186 S | 3/2007 | Silberberg | |
| D539,679 S | 4/2007 | Silberberg | |
| 7,644,506 B2 * | 1/2010 | Wong | 33/373 |
| D613,194 S | 4/2010 | Silberberg | |
| 7,802,372 B1 * | 9/2010 | Silberberg | 33/451 |
| 7,946,045 B2 | 5/2011 | Allemand | |
| 7,975,393 B2 * | 7/2011 | Sparrow | 33/348 |
| 8,061,051 B2 | 11/2011 | Allemand | |
| D722,513 S * | 2/2015 | Silberberg | D10/69 |

(Continued)

FOREIGN PATENT DOCUMENTS

JP 2161116 U * 7/2010 ............ G01C 9/28

*Primary Examiner* — R. A. Smith
(74) *Attorney, Agent, or Firm* — James E. Brunton

(57) ABSTRACT

A bubble type level for determining the orientation of a structure that includes first and second differently oriented bubble vials that are secured within the level body in a manner such that if either of the bubble vials become broken or otherwise damaged, it can be easily replaced and the level need not be discarded. The bubble type level of the invention also includes a novel connector mechanism that enables the level to be removably interconnected with the structure to be leveled. The level further includes a plurality of longitudinally spaced magnets that are connected to various surfaces of the level and a bulls-eye level that is mounted on the top surface of the level body.

4 Claims, 4 Drawing Sheets

(56) References Cited

U.S. PATENT DOCUMENTS

| | | | |
|---|---|---|---|
| D722,514 S * | 2/2015 | Silberberg | D10/69 |
| 9,021,710 B2 * | 5/2015 | Silberberg | 33/371 |
| 2005/0252016 A1 * | 11/2005 | Helda et al. | 33/375 |
| 2006/0021239 A1 * | 2/2006 | Brown | 33/365 |
| 2010/0131015 A1 | 5/2010 | Kozak | |
| 2011/0119941 A1 * | 5/2011 | Steele et al. | 33/379 |
| 2012/0151785 A1 * | 6/2012 | Lettkeman et al. | 33/301 |
| 2015/0075017 A1 * | 3/2015 | Christianson | 33/371 |
| 2015/0096182 A1 * | 4/2015 | Silberberg | 33/381 |

\* cited by examiner

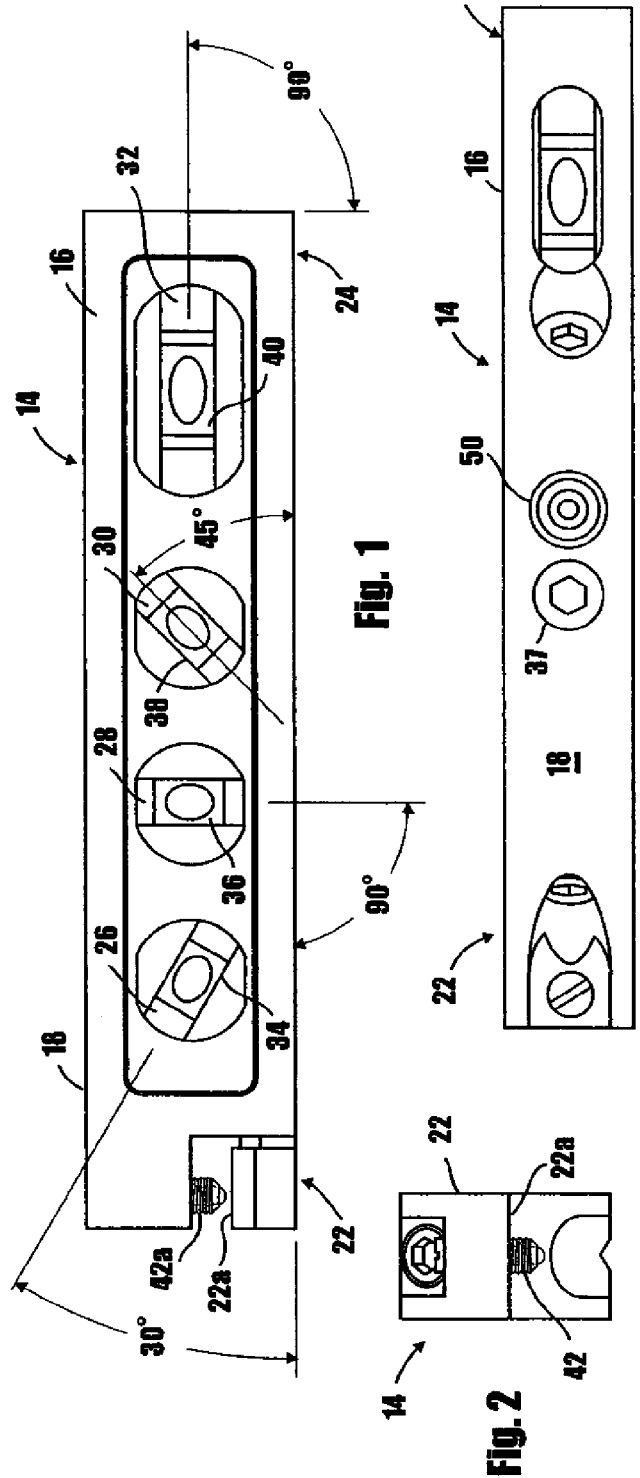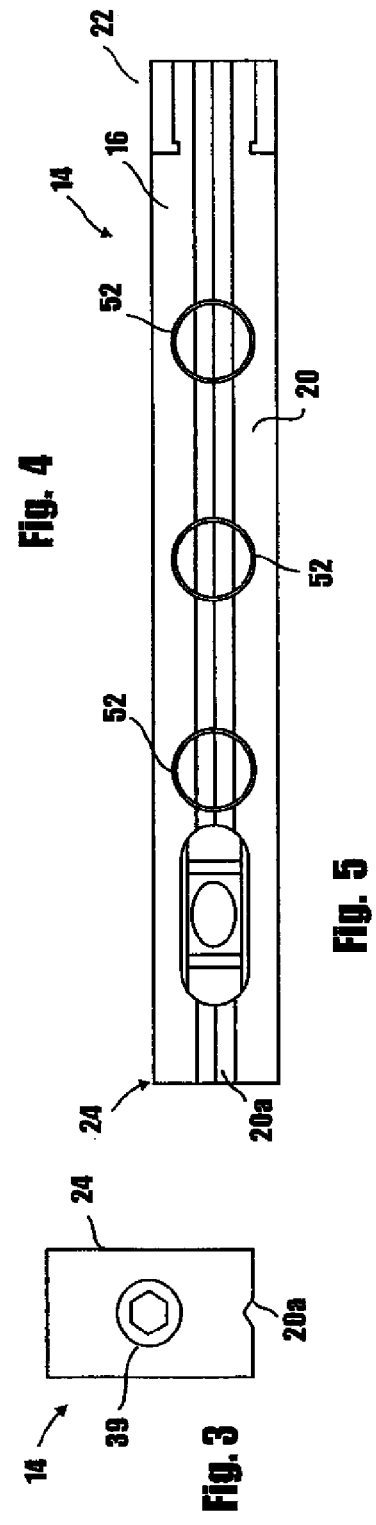

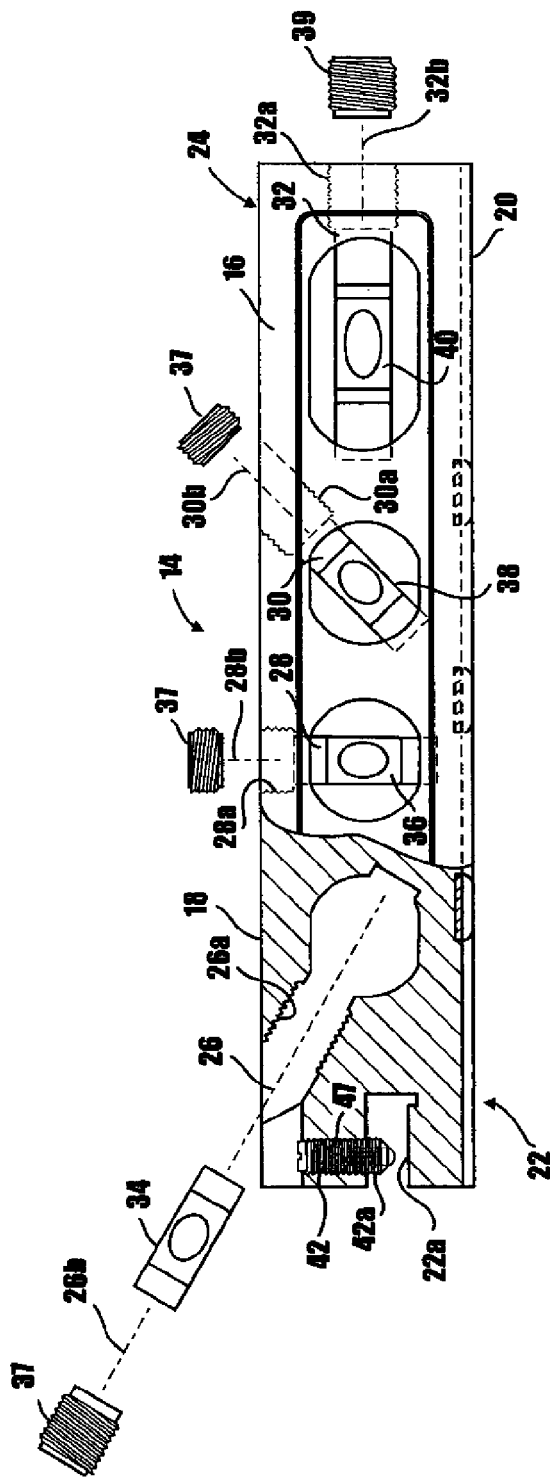
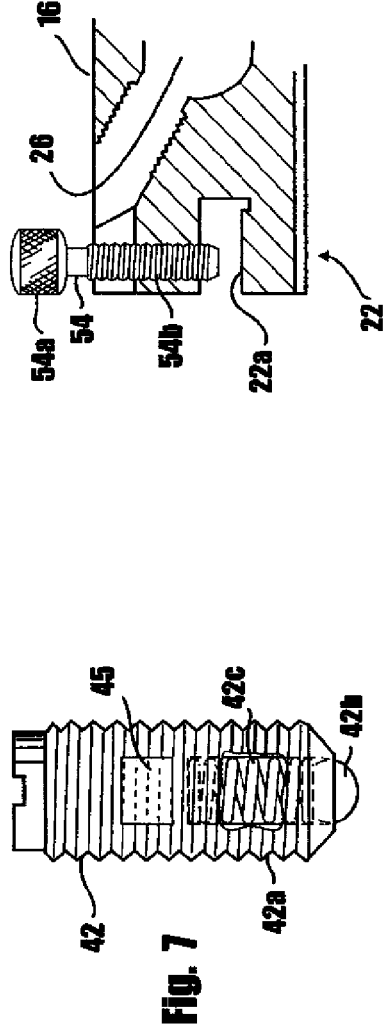

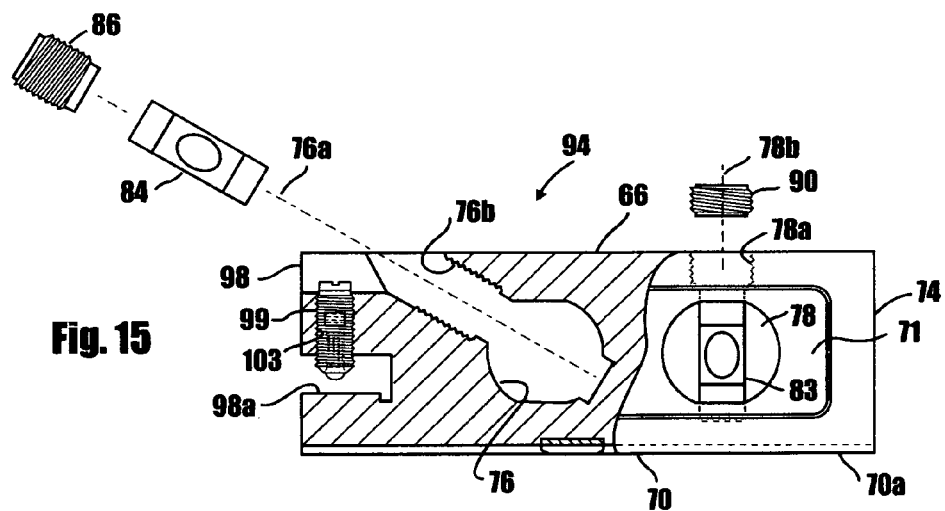
Fig. 15
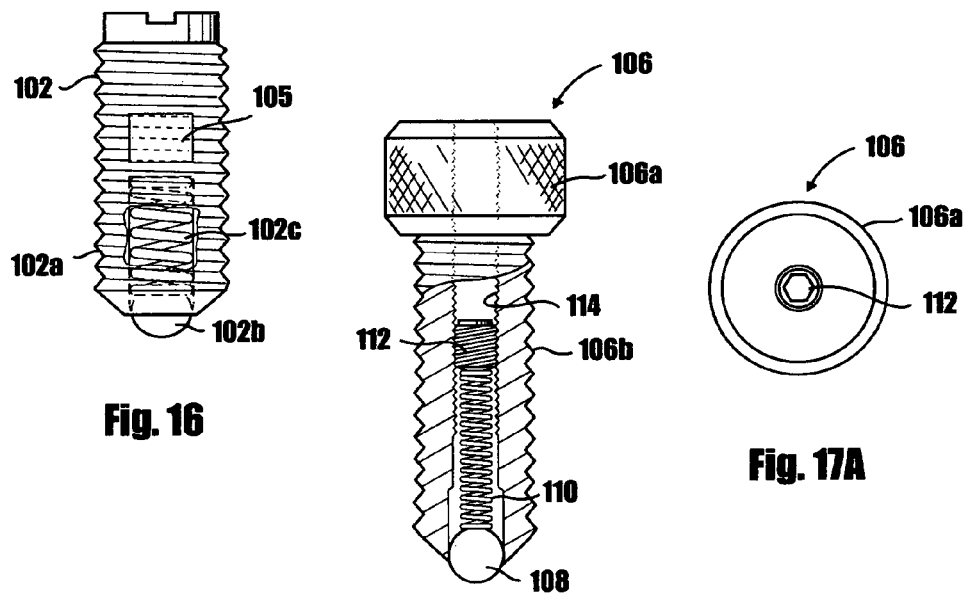
Fig. 16
Fig. 17
Fig. 17A

BUBBLE LEVEL

CROSS-REFERENCE TO RELATED APPLICATIONS

This is a Continuation In Part of co-pending U.S. application Ser. No. 13/528,623 filed Jun. 20, 2012.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to tools used in the construction industry. More particularly, the invention concerns a specially designed bubble level having replaceable bubble vials and including a novel connector mechanism for releasably connecting the level to the structure to be leveled.

2. Description of Related Art Including Information Disclosed Under 37 CRF 1.97 and 1.98

Bubble levels of various designs have been suggested in the past and are widely used by construction workers to determine the orientation of a particular structure or surface with respect to a reference axis. A typical bubble level generally comprises an elongated body that has a pair of opposing, generally parallel working surfaces and includes a plurality of openings having bubble vials permanently secured therein. The bubble vials are typically aligned in different directions relative to the working surfaces and function to indicate the orientation of a structure. For example, one vial may be aligned in a direction perpendicular to the working surfaces, another may be aligned in a direction parallel to the working surfaces and a third may be aligned in an angular direction. Typically, the vial contains a fluid and a bubble, and the user views the position of the bubble within the vial to determine the position of the tool relative to the working surfaces.

A novel and highly useful level construction is disclosed in U.S. Pat. No. 7,802,372 issued to the present inventor. This patent, which is entitled "Removable Laser Base Attachment for Bubble Levels", describes a bubble level that includes a body, a laser beam generator, and a removable securement. The body has a flat top surface that the level is secured to and a bottom surface that is flat and parallel to the top surface. A laser diode mounted in a module emits a visible laser beam upon application of power from a battery that is controlled by a switch. The module, batteries, and switch are mounted in a through bore in the body. The laser base is removably secured to the bubble level by any manner appropriate to the shape of the level. In one such securement, the level has a T-shaped cross-section and the body has a complementary slot into which the level slides. When the level reference surface abuts the top surface of the laser base, a thumb screw is tightened to frictionally secure the level in the base.

BRIEF SUMMARY OF THE INVENTION

It is an object of the present invention to provide a bubble type level for determining the orientation of a structure that includes a plurality of differently oriented bubble vials that are secured within the level body in a manner such that, if any one of the bubble vials become broken, or otherwise damaged, it can be easily replaced and the level need not be discarded.

Another object of the invention is to provide a bubble type level of the afore mentioned character in which the bubble vials are securely held in position within threaded chambers formed in the level body by easily removable threaded cap screws.

Another object of the invention is to provide a bubble type level of the character described which includes a novel connector mechanism that enables the level to be removably interconnected with the structure to be leveled. In one form of the invention, the connector mechanism is provided in the form of a conventional, self-contained ball-and-spring device that is threadably connected to the level body proximate one end thereof.

Still another object of the invention is to provide a bubble type level of the class described that includes a plurality of longitudinally spaced magnets that are connected to the bottom surface of the level so as to permit the level to be conveniently, removably connected to any ferrous structure that is being leveled.

Yet another object of the invention is to provide a bubble type level of the type described in the preceding paragraphs that includes a bulls-eye level that is mounted on the top surface of the level body proximate the center of the level.

These and other objects of the invention will be realized by the level construction illustrated in the drawings and described in the paragraphs that follow.

BRIEF DESCRIPTION OF SEVERAL VIEWS OF THE DRAWINGS

FIG. 1 is a side elevational view of one form of the leveling device of the invention.

FIG. 2 is a right end view of the leveling device shown in FIG. 1.

FIG. 3 is a left end view of the leveling device shown in FIG. 1.

FIG. 4 is a top plan view of the leveling device shown in FIG. 1.

FIG. 5 is a bottom plan view of the leveling device shown in FIG. 1.

FIG. 6 is a side elevational, exploded view partially in cross-section of the leveling device of the invention.

FIG. 7 is a greatly enlarged, side elevational view of the spring-ball-screw component of the leveling device of the invention.

FIG. 8 is a fragmentary, cross-sectional view of the right end portion of an alternate form of the leveling device of the invention.

FIG. 15 is a side elevational, exploded view partially in cross-section of yet another form of leveling device of the invention.

FIG. 16 is a greatly enlarged, side elevational view of the spring-ball-screw component of the leveling device shown in FIG. 15.

FIG. 17 is a greatly enlarged, cross-sectional view of an alternate form of spring-ball-screw component that can be used in connection with the leveling device shown in FIG. 15.

FIG. 17A is a top plan view of the alternate form of spring-ball-screw component shown in FIG. 17.

DETAILED DESCRIPTION OF THE INVENTION

Figure 9:
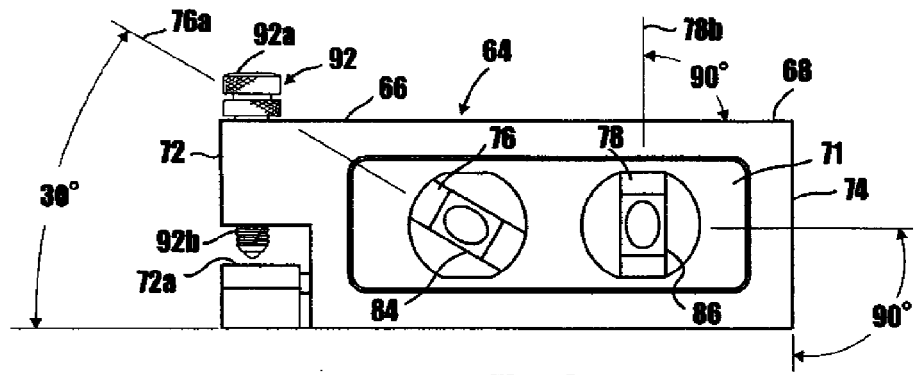
FIG. 9 is a side elevational view of an alternate form of leveling device of the invention.
Figure 10:
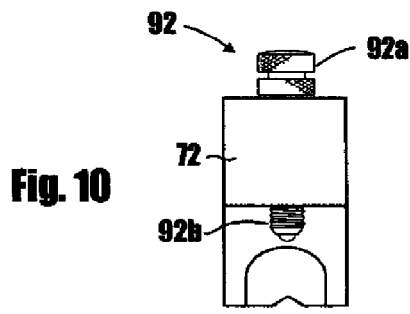
FIG. 10 is a right end view of the leveling device shown in FIG. 9.

Referring to the drawings and particularly to FIGS. 1 through 6, one form of the level of the invention for determining the orientation of a structure is there shown and generally designated by the numeral 14. Level 14 here comprises an elongate body 16 having a top surface 18, a bottom surface 20 and first and second end portions 22 and 24, respectively. For a purpose presently to be discussed, first end portion 22 is provided with a slot 22a. As best seen in FIGS. 3 and 5, bottom surface 20 is provided with a longitudinally extending, generally "V" shaped groove 20a.

As best seen in FIGS. 1 and 6 of the drawings, body 16 has a plurality of differently oriented vial chambers 26, 28, 30 and 32. Vial chamber 26 has a threaded end portion 26a and a central axis 26b that is disposed at an angle of approximately 38 degrees with respect to bottom surface 20. Vial chamber 28 has a threaded end portion 28a and a central axis 28b that is disposed at an angle of approximately 90 degrees with respect to bottom surface 20. Vial chamber 30 has a threaded end portion 30a and a central axis 30b that is disposed at an angle of approximately 45 degrees with respect to bottom surface 20. Vial chamber 32 has a threaded end portion 32a and a central axis 32b that is disposed in a generally parallel relationship with bottom surface 20. It is to be understood that the angles of the axes of the central axis of each of the vial chambers can vary depending upon the end use of the improved level.

A conventional bubble vial 34 is disposed within vial chamber 26 and is uniquely removably secured there within by a threaded connector that is threadably receivable within threaded opening 26a of vial chamber 26. The threaded connector, which is here provided in the form of a conventional cap screw 37 (FIG. 6), is moveable between first and second positions to secure the bubble vial 34 within vial chamber 26 (FIG. 1). A conventional bubble vial 36 is disposed within vial chamber 28 and is uniquely removably secured there within by a threaded connector that is threadably receivable within threaded opening 28a of vial chamber 28. The threaded connector, which is also here provided in the form of a conventional cap screw (FIGS. 3 and 6), is moveable between first and second positions to secure the bubble vial 36 within vial chamber 28 (FIG. 1). In similar manner, a conventional bubble vial 38 is disposed within vial chamber 30 and is uniquely removably secured there within by a threaded connector that is threadably receivable within threaded opening 30a of vial chamber 30. Once again, the threaded connector is provided in the form of a conventional cap screw 37 (FIGS. 3 and 6) that is moveable between first and second positions to secure the bubble vial 38 within vial chamber 30 (FIG. 1).

In like manner, as shown in FIG. 1, a conventional bubble vial 40 is disposed within vial chamber 32 and is removably secured there within by a conventional cap screw 39 (FIG. 6) which is movable between first and second positions to secure the bubble vial 40 within vial chamber 32.

With the construction thus described, any one of the bubble vials of the level can be conveniently removed and replaced by simply removing the threaded cap screw from the threaded end portion of the vial chamber and then by removing the bubble vial from its chamber. Unlike the prior art levels, if a given bubble vial is broken or otherwise damaged, it can be easily replaced and the level need not be discarded.

Another highly important feature of the present invention resides in the provision of a connector mechanism for releasably interconnecting body 16 with the structure to be leveled. The connector mechanism, which is here provided in the form of a conventional, self-contained ball-and-spring device 42, is threadably connected to body 16 proximate first end portion 22. As depicted in FIG. 7, the self-contained ball-and-spring device 42 has a threaded shank portion 42a that, when the device is threadably connected to the level body, at least partially extends into slot 22a of the first end portion of the body (FIG. 6). Ball-and-spring device 42 also includes a ball 42b and a biasing spring 42c that are arranged in the manner illustrated in FIG. 7.

As illustrated in FIG. 7, shank portion 42a of the ball-and-spring device 42 includes a nylon patch 45 that functions to prevent the device from accidentally moving within threaded portion 47 of the end portion 22 due to vibration.

Self-contained ball-and-spring devices 42, which are suitable for the present purpose, are readily commercially available from several sources including the Carr Lane Manufacturing Co. of St. Louis, Mo.

Turning now to FIG. 4 of the drawings, another important feature of the present invention resides in the provision of a bulls-eye level 50 that is mounted on the top surface 18 of body 16 proximate the center of the level. Bulls-eye level 50 is readily commercially available from several sources including the Johnson Level & Tool Mfg. Co., Inc. of Mequon, Wis.

Referring to FIG. 5, still another important feature of the present invention resides in the provision of a plurality of longitudinally spaced magnets 52 that are connected to the bottom surface 20 of body 16. In use, these magnets permit the level to be conveniently, removably connected to any ferrous structure that is being leveled. Magnets 52 are readily commercially available from several sources including Applied Magnets of Plano, Tex.

Turning now to FIG. 8, an alternate form of connector mechanism for releasably interconnecting body 16 with the structure to be leveled is there shown. This alternate form of connector mechanism is provided in the form of a conventional screw 54 that has a knurled head 54a and threaded shank portion 54b. When the device is threadably connected to the level body 16 in the manner shown in FIG. 8, threaded shank portion 54b at least partially extends into slot 22a of the first end portion of body 16.

Referring next to FIGS. 9 through 14, an alternate form of the bubble level of the invention for determining the orientation of a structure is there shown and generally designated by the numeral 64. Level 64 is similar in many respects to the level shown in FIGS. 1 through 8 and like numerals are used in FIGS. 9 through 13 to identify like components.

Figure 11:
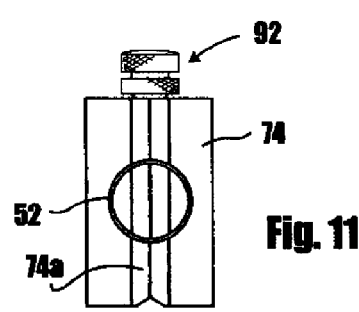
FIG. 11 is a left end view of the leveling device shown in FIG. 9.
Figure 13:
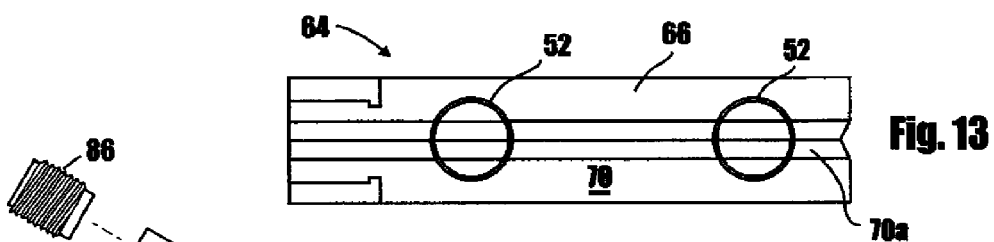
FIG. 13 is a bottom plan view of the leveling device shown in FIG. 9.
Figure 14:
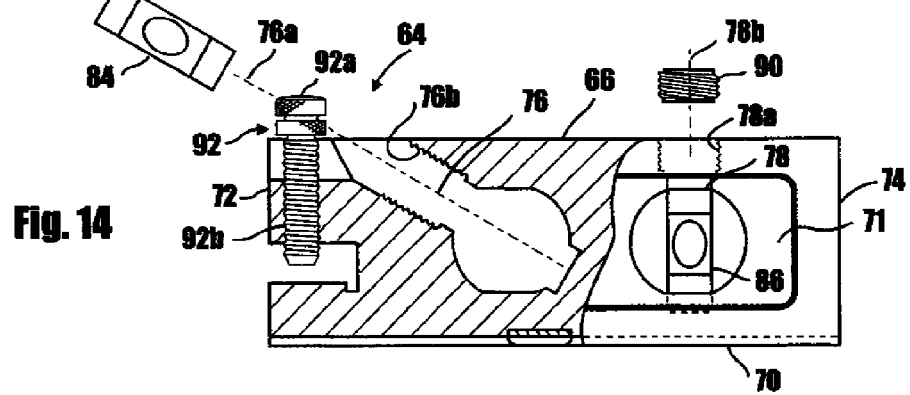
FIG. 14 is a side elevational, exploded view partially in cross-section of the leveling device of the embodiment shown in FIG. 9.

Level 64 here comprises an elongate body 66 having a top surface 68, a bottom surface 70, a recessed central portion 71 and first and second end portions 72 and 74, respectively. As before, first end portion 72 is provided with a slot 72a. As best seen in FIG. 13, bottom surface 70 is provided with a longitudinally extending, generally "V" shaped groove 70a. As best seen in FIG. 11, end surface 74 is also provided with a generally "V" shaped groove 74a.

As shown in FIG. 9, body 66 has first and second differently oriented vial chambers 76 and 78. First vial chamber 76 has a central axis 76a that is disposed at an angle of approximately 30 degrees with respect to bottom surface 70. Second vial chamber 78 has a threaded end portion 78a and a central axis 78b that is disposed at an angle of approximately 90 degrees with respect to bottom surface 70. It is to be understood that the angles of the axes of the central axis of each of the vial chambers can vary depending upon the end use of the improved level.

A conventional bubble vial 84 is disposed within first vial chamber 76 and is uniquely removably secured there within by a threaded connector that is threadably receivable within a threaded opening 76b of first vial chamber 76. The threaded connector, which is here provided in the form of a conventional cap screw 86 (FIG. 14), is movable between first and second positions to secure the bubble vial 84 within vial chamber 76 in the manner depicted in FIG. 9. A conventional bubble vial 86 is disposed within second vial chamber 78 and is uniquely removably secured there within by a threaded connector that is threadably receivable within threaded opening 78a of second vial chamber 78. The threaded connector, which is also here provided in the form of a conventional cap screw 90 (FIG. 14), is movable between first and second positions to secure the bubble vial 86 within vial chamber 78 in the manner depicted in FIG. 9.

With the construction thus described, either or both of the bubble vials of this alternate form of level can be conveniently removed and replaced by simply removing the threaded cap screws from the threaded end portions of the vial chamber and then by removing the bubble vials from their chambers. Unlike the prior art levels, if a given bubble vial is broken or otherwise damaged, it can be easily replaced and the level need not be discarded.

Another highly important feature of this latest form of the invention resides in the provision of a connector mechanism for releasably interconnecting body 66 with the structure to be leveled. The connector mechanism is here provided in the form of a conventional screw 92 that has a knurled head 92a and threaded shank portion 92b. When the device is threadably connected to the level body 66 in the manner shown in FIG. 9, threaded shank portion 92b at least partially extends into slot 72a of the first end portion of body 66. It is to be understood that, if desired, a self-contained ball-and-spring device, such as device 42 can be used instead of screw 92.

Figure 12:
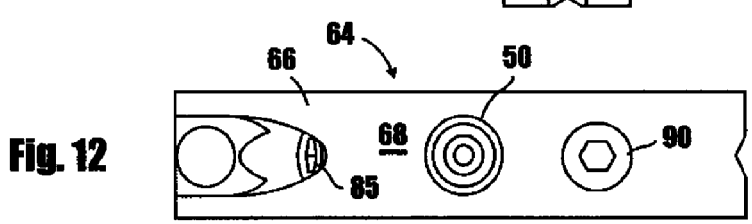
FIG. 12 is a top plan view of the leveling device shown in FIG. 9.

Turning now to FIG. 12 of the drawings, another important feature of this latest form of the invention resides in the provision of a bulls-eye level 50 that is mounted on the top surface 68 of body 66 proximate the center of the level. Bulls-eye level 50, which is substantially identical in construction and operation to that described in connection with the embodiment of FIGS. 1 through 8, is readily commercially available from several sources including the Johnson Level & Tool Mfg. Co., Inc. of Mequon, Wis.

Referring to FIG. 13, still another important feature of the present invention resides in the provision of a plurality of longitudinally spaced magnets 52 that are connected to the bottom surface 70 and to the end portion 74 of body 66 (FIG. 11). In use, these magnets permit the level to be conveniently, removably connected to any ferrous structure that is being leveled. Magnets 52 are readily commercially available from several sources including Applied Magnets of Plano, Tex.

Referring next to FIGS. 15 and 16, yet another form of the bubble level of the invention for determining the orientation of a structure is there shown and generally designated by the numeral 94. Level 94 is similar in many respects to the level shown in FIGS. 9 through 14 and like numerals are used in FIGS. 15 and 16 to identify like components.

Level 94 here comprises an elongate body 66 having a top surface 68, a bottom surface 70, a recessed central portion 71 and first and second end portions 98 and 74, respectively. First end portion 98 is provided with a slot 98a and bottom surface 70 is provided with a longitudinally extending, generally "V" shaped groove 70a. As before, end surface 74 is also provided with a generally "V" shaped groove.

Body 66 has first and second differently oriented vial chambers 76 and 78. First vial chamber 76 has a central axis 76a that is disposed at an angle of approximately 30 degrees with respect to bottom surface 70. Second vial chamber 78 has a threaded end portion 78a and a central axis 78b that is disposed at an angle of approximately 90 degrees with respect to bottom surface 70. It is to be understood that the angles of the axes of the central axis of each of the vial chambers can vary depending upon the end use of the improved level.

A conventional bubble vial 84 is disposed within first vial chamber 76 and is uniquely removably secured there within by a threaded connector that is threadably receivable within a threaded opening 76b of first vial chamber 76. The threaded connector, which is here provided in the form of a conventional cap screw 86 (FIG. 15), is movable between first and second positions to secure the bubble vial 84 within vial chamber 76 in the manner depicted in FIG. 9. A conventional bubble vial 86 is disposed within second vial chamber 78 and is uniquely removably secured there within by a threaded connector that is threadably receivable within threaded opening 78a of second vial chamber 78. The threaded connector, which is also here provided in the form of a conventional cap screw 90 (FIG. 14), is movable between first and second positions to secure the bubble vial 86 within vial chamber 78.

With the construction thus described, either or both of the bubble vials of this alternate form of level can be conveniently removed and replaced by simply removing the threaded cap screws from the threaded end portions of the vial chamber and then by removing the bubble vials from their chambers. Unlike the prior art levels, if a given bubble vial is broken or otherwise damaged, it can be easily replaced and the level need not be discarded.

Another highly important feature of this latest form of the invention resides in the provision of a connector mechanism for releasably interconnecting body 66 with the structure to be leveled. The connector mechanism, which is of the character shown in FIG. 16, is here provided in the form of a conventional, self-contained ball-and-spring device that is threadably connected to body 66 proximate first end portion 98. As depicted in FIG. 16, the self-contained ball-and-spring device 102 has a threaded shank portion 102a that is threadably received within a threaded bore 103 formed in body 66. When the device is threadably connected to the level body, threaded shank portion 102a at least partially extends into slot 98a of the first end portion of the body (FIG. 15). Ball-and-spring device 102 also includes a ball 102b and a biasing spring 102c that are arranged in the manner illustrated in FIG. 16.

As illustrated in FIG. 16, shank portion 102a of the ball-and-spring device 102 includes a nylon patch 105 that functions to prevent the device from accidentally moving within threaded portion 99 of the end portion 98 due to vibration.

Self-contained ball-and-spring devices 102, which are suitable for the present purpose, are readily commercially available from several sources including the Can Lane Manufacturing Co. of St. Louis, Mo.

An alternate form of connector mechanism for releasably interconnecting body 66 with the structure to be leveled is illustrated in FIGS. 17 and 17A of the drawings and is generally designated by the numeral 106. This alternate form of connector mechanism, which is similar in some respects to ball-and-spring device 102, comprises a self-contained ball-and-spring device having a knurled head 106a and threaded shank portion 106b. Device 106 can be interconnected with body 66 in much the same manner as the previously described screw 92 was connected to body 66. As depicted in FIG. 17, when device 106 is threadably connected to the level body, the device at least partially extends into slot 98a of the first end portion of the body (see for example FIG. 15). Ball-and-spring device 106 also includes a ball 108, a biasing spring 110 and a spring tension adjustment screw 112, all of which are arranged in the manner illustrated in FIG. 17. Access to adjustment screw 112 can be obtained via the central passageway 114 formed in the device so that the position of the screw can be readily adjusted through the use of a conventional allen wrench.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

The invention claimed is:

1. A level for determining the orientation of a structure comprising:
    (a) a body including first and second vial chambers, each having a threaded opening;
    (b) a first bubble vial disposed within said first vial chamber;
    (c) a second bubble vial disposed within said second vial chamber;
    (d) a first threaded connector receivable within said threaded opening of said first vial chamber for movement from a first position to a second position in engagement with said first bubble vial to secure said first bubble vial within said first vial chamber;
    (e) a second threaded connector receivable within said threaded opening of said second vial chamber for movement from a first position to a second position in engagement with said second bubble vial to secure said second bubble vial within said second vial chamber; and
    (f) a connector mechanism connected to said body for releasably interconnecting said body with the structure, said connector mechanism comprising a self contained ball and spring device and including a screw having a head portion and a threaded shank portion.

2. The level as defined in claim 1 in which said ball-and-spring device includes a shank portion having a nylon patch.

3. A level for determining the orientation of a structure comprising:
    (a) a body having a top surface, a bottom surface and first and second end portions, said first end portion having a slot, said body having a plurality of vial chambers, each said vial chamber having a threaded opening;
    (b) a bubble vial disposed within each of said vial chambers of said body;
    (c) a threaded connector receivable within said threaded opening of each of said vial chambers for movement between first and second positions to secure said bubble vials within said vial chambers;
    (d) a connector mechanism connected to said body proximate said first end portion thereof for releasably interconnecting said body with the structure;
    (e) at least one magnet connected to said bottom surface of said body;
    (f) at least one magnet connected to said second end portion of said body;
    (g) a bulls-eye level connected to said top surface of said body; and
    (h) a connector mechanism connected to said body proximate said first end portion thereof for releasably interconnecting said body with the structure, said connector mechanism comprising a self contained ball and spring device.

4. The level as defined in claim 3 in which said ball-and-spring device includes a shank portion having a central passageway and a biasing spring and a spring tension adjustment screw disposed within said central passageway.

* * * * *